United States Patent [19]

Ford

[11] Patent Number: 4,789,416
[45] Date of Patent: Dec. 6, 1988

[54] METHOD OF MANUFACTURING A PREFORM FROM FIBER REINFORCED COMPOSITE MATERIAL

[75] Inventor: Robert J. Ford, Bromall, Pa.

[73] Assignee: The Boeing Company, Seattle, Wash.

[21] Appl. No.: 459,176

[22] Filed: Jan. 19, 1983

Related U.S. Application Data

[63] Continuation of Ser. No. 278,925, Jun. 30, 1981, abandoned.

[51] Int. Cl.$^4$ .................. B32B 31/00; B32B 31/04
[52] U.S. Cl. .................. 156/222; 156/245; 264/258; 264/265; 264/320
[58] Field of Search .................. 156/219, 244.11, 222, 156/245, 196, 212; 264/311, 285, 258, 241, 265, 327, 320; 244/17.11; 29/156.8 P, 156.8 T, 156.8 B

[56] References Cited

U.S. PATENT DOCUMENTS

| | | | |
|---|---|---|---|
| 3,235,530 | 2/1966 | Crouch et al. | 264/258 |
| 3,582,422 | 6/1971 | Wilkins | 156/245 |
| 3,615,982 | 10/1971 | Bandremer | 156/212 |
| 3,664,908 | 5/1972 | Horvath | 156/245 |
| 3,746,589 | 7/1973 | Reinke | 264/258 |

Primary Examiner—Michael W. Ball
Assistant Examiner—Louis Falasco
Attorney, Agent, or Firm—Jones, Tullar & Cooper

[57] ABSTRACT

A method of manufacturing a preform from uncured multiple laminates of resins impregnated fiber reinforced composite material is proposed. The preform has irregular shape such that at least one edge of any transverse cross-section of the preform varies along its length with respect to a reference co-ordinate set of axes, and further such that the cross sectional area of every cross section of the preform along the length of the preform is predetermined. A layup is formed to a length substantially equal to that of the preform from uncured multiple laminates of resin impregnated fiber reinforced composite material to have a regular shape such that no edge of any transverse cross-section varies along its length with respect to the reference co-ordinate set of axes. The cross-sectional area of every transverse cross-section of the layup along its length is substantially equal to a predetermined corresponding cross-section of the preform. The layup is placed in a tool having a part including a cavity defining part of the shape of the preform, and cold compacted or coined to fill the cavity thereby transforming the layup into the desired shape of the preform.

14 Claims, 1 Drawing Sheet

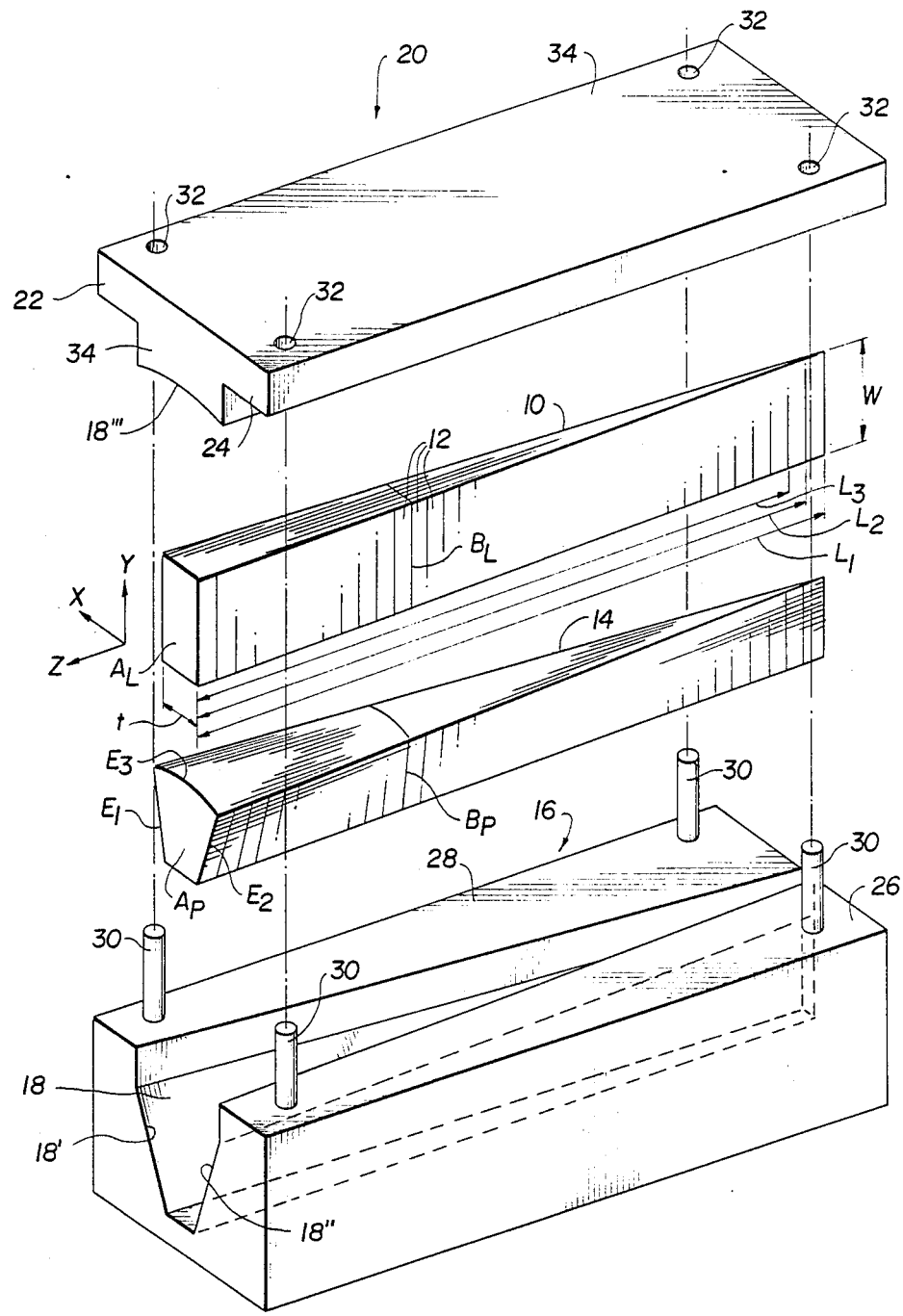

METHOD OF MANUFACTURING A PREFORM FROM FIBER REINFORCED COMPOSITE MATERIAL

This is a continuation of application Ser. No. 278,925, filed 6/30/81, now abandoned.

BACKGROUND OF THE INVENTION

1. Field of the Invention and Definition of Terms

The invention relates to the art of fabricating irregularly shaped preforms of parts from a multiple thickness layup of fiber-reinforced plastic composite material.

In one application of this art, the manufacture of composite helicopter rotor blades, for example, so-called filler segments or parts made from preforms of the kind noted above are utilized. These filler segments or parts typically have irregular shapes to conform them to the shape of corresponding spaces in the rotor blade which are to be filled by the filler segments or parts.

A preform is understood in the art to be an uncured part, i.e., it is a part formed from a layup to a predetermined shape which is yet to be cured into a final structural part. In the manufacture of helicopter rotor blades the preform may be cured separately, in assembly with the rotor blade, or in any subassembly of the rotor blade, such as the fillers cured with the spar subassembly. For more on the art of fabricating a helicopter rotor blade from a composite material, see U.S. Pat. Nos. 3,237,697 and 4,095,322.

A layup is understood in the art to be an aggregate of individual tape strips (laminates), the tape strips comprising fiber reinforced plastic material. The fibers or filaments are preferably unidirectional for the filler preforms made according to the present invention.

An irregular shaped preform is understood in the art to be one in which at least one edge of the preform transverse cross-section varies along its length with respect to a reference co-ordinate set of axes. For example, a rectangular or square cross-section does not include an edge (any of the four sides) which varies along its length relative to a two-dimensional co-ordinate set of axes, whereas a triangular cross-section does.

This invention employs cold compacting or coining of the layup to form the preform. The cold compacting or coining process involves the application of pressure at essentially room temperature to the layup to deform it to achieve a preform of a desired shape. A tool is used for this purpose and includes a male and female portion, hereinafter referred to as the mold.

2. Description of an Existing Method

The manufacture of irregularly shaped preforms from laminates, rovings and other forms of fiber reinforced resin matrix material has involved, among other steps, producing a layup of many thicknesses of the material in its uncured state formed closely to the desired shape of the preform to be made. Each laminate must be cut by hand using a scissors or a knife edge in progressively developed sizes and shapes so that when laid one on another in a prescribed order the layup closely approximates the desired shape of the preform. A layup conforming nearly exactly to the final shape is inserted into a mold tool whose cavity also closely approximates the outer contour of the preform and of the layup. The mold is closed by a closure mold portion having the desired outer contour formed on its inner surface. Thus, the uncured layup is fully enclosed within the mold and fits the mold cavity with substantial precision. The layup is then cold compacted or coined by the application of pressure to the layup in the mold. The applied pressure supplies the force needed to produce the adherence of the laminates so that the preform will retain its shape prior to being cured. The shape itself, however, is imparted by the noted cutting and hand assembly of the layup.

Since the layup must be produced by hand, the time factor involved is quite high. The fabrication is therefore costly.

Also, in the process of forming the layup, considerable care is taken to force air from between the lamina so that the layup will fit within the mold cavity. To this end, frequent rolling of the tacky lamina after each ply is laid on the preceding ply is desirable in order to expel the air, because if an excessive amount of air remains with the layup its volume may exceed the capacity of the mold to accept its bulk. Even though the mold is sized to accommodate some degree of air entrapment, if this is overdone, the mold may be too large compared to the reduced size the composite attains during the cold compaction or coining process.

The air also presents a problem during the subsequent cure cycle of the preform with the composite blade. The presence of entrapped air in unacceptably large quantities within the layup will produce a cured part whose resin matrix is porous, frothy and aerated in appearance and in fact. Expelling the air, therefore, also contributes to the high time factor.

OBJECTS AND SUMMARY OF THE INVENTION

It is an object of the present invention to provide a method which reduces the cost, time and complexity associated with forming a preform of irregular shape.

A related object of the present invention is to provide a method in accordance with the previously stated object where the preform is formed by cold compacting or coining a layup in a mold which defines the desired final shape of the preform.

A further related and more specific object of the present invention is to provide a method in accordance with the previously stated objects where the layup for the preform has a uniform transverse cross-section, i.e., a cross-section in which the edges do not vary with respect to a reference co-ordinate set of axes. For example, the cross-section can be rectangular.

A further object of the present invention, related more specifically to the last stated object is to provide a method of making a layup which avoids the need to cut the multiple lamina of the aggregate forming the layup to differing shapes.

Another object of the present invention is to provide a method in accordance with the previously stated objects in which the preform is substantially free of entrapped air within the resin matrix.

The invention achieves these objects as a method according to which a layup is first produced by an aggregate of laminates of uncured fiber reinforced resin composite material, and subsequently transformed by cold compacting or coining in a tool to a preform of the desired shape. The tool is such that it defines the final desired shape of the preform and the method according to one aspect is further defined such that the layup is given the simplest uniform transverse cross-sectional shape, for example, rectangular, which shape is then transformed by the tool, by the cold compacting or coining procedure to the desired shape, which is irregular as this term is understood from the above definition.

While the cold compacting or coining procedure changes the shape of the layup in forming the preform, the bulk factor of the layup is not eliminated, i.e., corresponding cross-sectional areas are substantially identical. For example, if the cross-sectional area of one end of the intended preform is one square inch, the corresponding cross-sectional area of the same end of the layup should also be substantially one square inch.

BRIEF DESCRIPTION OF THE DRAWING

The sole FIGURE is an isometric view illustrating the two parts of the mold, a layup placed in the mold and the preform formed from the layup by cold compacting or coining in the mold.

DESCRIPTION OF A PREFERRED EMBODIMENT

The preferred embodiment will be described with reference to an irregularly shaped filler preform used at the root end of a composite rotor blade which has a uniformly varying cross-section along its length.

Referring to the figure, layup 10 formed of uncured laminates 12 of fiber-reinforced composite material is shown having a rectangular cross-section which uniformly varies along its length, but is always rectangular. To achieve the desired variance, each laminate has a predetermined length ($L_1$, $L_2$, $L_3$, etc.) which varies from the lengths of other laminates. The width (w) of each laminate is equal regardless of the respective lengths of the laminates, and is preferably the standard width of the laminate (tape) as it is supplied by the manufacturer to the fabricator. In this way, a laminate that is wider than required to form the part need not be cut along its length to the required width, thus saving the fabricator considerable time and cost and avoiding the risk of inaccuracy that normally accompanies the tedium of having to cut the standard width laminates the required dimension. The thickness (t) of the layup necessarily varies longitudinally since the lamina have varying lengths.

The direction in which the reinforcing strands of fiber run is preferably unidirectional, although it is conceivable that they may vary among the laminates.

The preform to be formed from the layup 10, identified as reference number 14, has a predetermined irregular shape such as that shown at plane $A_P$ where its cross-section has sloping edges $E_1$ and $E_2$ and a nonplanar arcuate edge $E_3$. The thickness of the preform 14 varies along its length as shown. To reproduce the preform 14 from the layup 10, it is necessary that the bulk factor of the two be substantially identical, i.e., corresponding cross-sectional areas must be substantially identical. For example, the cross-sectional areas of the layup 10 and preform 14 at X-Y planes $A_L$, $A_P$ and $B_L$, $B_P$, must be substantially identical. Knowing the areas $A_P$ and $B_P$, and given a known width (w) of the laminates of the layup 10, it becomes necessary to vary the thickness (t) of the layup 10 along its length in order to achieve the correspondence needed.

Having achieved the desired correspondence, the preform 14 attains its final shape as a result of reforming the layup 10 in a tool by coining. The tool is shown as a mold having a male and female portion. A female mold portion 16 having a cavity 18 formed to the desired shape of the preform 14 is adapted to receive a male mold portion 20 that closes the mold cavity at the top. In the figure the ends of the female mold portion 16 are not shown in order to present the mold contour clearly, but would, if included, appear as plates in the X-Y plane that operate to close the longitudinal ends of the cavity.

The male mold portion 20 has a plunger portion 34 and lateral flanges 22, 24 that can seat on the upper planar surfaces 26, 28 of the female mold portion 16. Guide Pins 30, fixed to female mold portion 16 and extending upwardly from surfaces 26, 28 are received in the holes 32 formed at the four corners of the male mold portion 20 through flanges 22, 24. The pins when fitted within the holes fix the position of the mold portions 16, 20 one with respect to the other.

The layup 10 is placed in the cavity 18 of the female mold portion 16 and the mold portion 16, 20 are placed preferably in a press (not shown) which moves the male mold portion 20 relative to the female mold portion 16 such that the plunger portion 34 engages the layup 10 as it moves toward the cavity 18. The cavity 18 has sides 18' and 18" while the plunger portion 34 has an arcuate side 18'''. As the layup 10 is compacted or coined due to the pressure applied thereto by the moving plunger portion 34, the edges $E_1$, $E_2$ and $E_3$ are formed by engagement of the layup 10 with the sides 18', 18" and 18'''.

The layup 10 may be formed by hand by cutting the lamina of individual strips of composite material tape to the lengths indicated and the layup assembled, or with automatic dispensing equipment such as those disclosed in U.S. Pat. Nos. 3,775,219; 4,234,374; and 4,259,144, that cut the composite material tape to the required lengths and assembles the layup automatically.

Normally, a layup in the block form as shown in the figure is only produced when high volume fabrication procedures apply. Then, the layup is fabricated with the use of the automatic layup equipment, which is programmed to dispense tape of the required width, cut to the exact lengths and positioned lengthwise as required to form the layup.

During the hand layup, it is preferable to roll or compact the layup after each laminate is laid on another in order to dispel the air that is usually entrapped between lamina, the automatic dispensing equipment noted does so automatically.

Any irregularly shaped preform can be manufactured in accordance with the present invention. The exact shape must be known and its bulk factor established. With this information, a properly sized layup can be made, placed in the mold tool and cold compacted or coined to form the preform.

What is claimed is:

1. A method of manufacturing a preform with a tool and from uncured multiple laminates of resin impregnated fiber reinforced composite material, said preform having an irregular shape such that at least one edge of any transverse cross-section thereof varies along its length with respect to a reference co-ordinate set of axes, and further such that the cross-sectional area of every cross section of the preform along the length of the perform, and therefore its volume, is predetermined, said tool including a part having a cavity which defines at least part of the shape of the preform, comprising the steps of:

forming a layup to a length substantially equal to that of the preform from uncured multiple laminates of resin impregnated fiber reinforced composite material, said uncured multiple laminate layup when formed having a regular shape such that no edge of any transverse cross-section of the layup varies along its length with respect to said reference co-ordinate set of axes, such that the cross-sectional area of every cross-section of the layup along the length of the layup is substantially equal to a cross-sectional area of a corresponding cross section of the preform, and further such that the volume of the layup is substantially equal to the volume of the preform;

placing the layup in the cavity of said tool; and applying pressure to the tool to cold compact or coin the layup to fill the cavity thereby transforming the layup into the shape of the preform.

2. The method as defined in claim 1, wherein the layup is formed by hand.

3. The method as defined in claim 1, wherein the layup is formed by automatic equipment.

4. The method as defined in claim 1, wherein the layup is given a rectangular cross-section from the multiple laminates of fiber reinforced composite material.

5. The method as defined in claim 4, wherein the rectangular cross-section varies along the length of the layup.

6. The method as defined in claim 5, wherein the layup is formed by hand.

7. The method as defined in claim 5, wherein the layup is formed by automatic equipment.

8. The method of making a layup from uncured multiple laminates of resin impregnated fiber reinforced composite material for the manufacture of a preform having an irregular shape such that at least one edge of any transverse cross-section thereof varies along its length with respect to a reference co-ordinate set axes, and further such that the cross-sectional area of every cross section of the preform along the length of the preform, and therefore its volume, is predetermined, comprising the step of:

forming the layup to a length substantially equal to that of the preform from uncured multiple laminates of resin impregnated fiber reinforced composite material, said uncured multiple laminate layup when formed having a regular shape such that no edge of any transverse cross-section of the layup varies along its length with respect to said reference co-ordinate set of axes, such that the cross-sectional area of every cross-section of the layup along the length of the layup is substantially equal to a cross-sectional area of a corresponding cross-section of the preform, and further such that the volume of the layup is substantially equal to the volume of the preform.

9. The method as defined in claim 8, wherein the layup is formed by hand.

10. The method as defined in claim 8, wherein the layup is formed by automatic equipment.

11. The method as defined in claim 8, wherein the layup is given a rectangular cross-section from the multiple laminates of fiber reinforced composite material.

12. The method as defined in claim 11, wherein the rectangular cross-section varies along the length of the layup.

13. The method as defined in claim 12, wherein the layup is formed by hand.

14. The method as defined in claim 12, wherein the layup is formed by automatic equipment.

* * * * *